United States Patent
Liu et al.

(10) Patent No.: US 10,371,807 B2
(45) Date of Patent: Aug. 6, 2019

(54) RADAR APPARATUS AND TARGET OBJECT DETECTION METHOD

(71) Applicant: Panasonic Corporation, Osaka (JP)

(72) Inventors: Weijie Liu, Kanagawa (JP); Yoichi Nakagawa, Tokyo (JP)

(73) Assignee: Panasonic Corporation, Osaka (JP)

(*) Notice: Subject to any disclaimer, the term of this patent is extended or adjusted under 35 U.S.C. 154(b) by 299 days.

(21) Appl. No.: 15/443,761

(22) Filed: Feb. 27, 2017

(65) Prior Publication Data
US 2017/0269200 A1 Sep. 21, 2017

(30) Foreign Application Priority Data
Mar. 16, 2016 (JP) .................. 2016-052630

(51) Int. Cl.
*G01S 13/28* (2006.01)
*G01S 13/34* (2006.01)
*G01S 7/292* (2006.01)
*G01S 13/93* (2006.01)
*G01S 7/288* (2006.01)

(52) U.S. Cl.
CPC .......... *G01S 13/28* (2013.01); *G01S 7/2921* (2013.01); *G01S 13/282* (2013.01); *G01S 13/288* (2013.01); *G01S 13/34* (2013.01); *G01S 13/345* (2013.01); *G01S 13/931* (2013.01); *G01S 2007/2886* (2013.01)

(58) Field of Classification Search
CPC ........ G01S 13/28; G01S 13/34; G01S 13/282; G01S 13/288; G01S 13/345; G01S 13/931; G01S 2007/2886; G01S 7/2921

USPC ........................................... 342/134
See application file for complete search history.

(56) References Cited

U.S. PATENT DOCUMENTS

| | | | |
|---|---|---|---|
| 2006/0140249 A1* | 6/2006 | Kohno | H04B 1/7172 375/130 |
| 2008/0094274 A1 | 4/2008 | Nakanishi | |
| 2010/0109939 A1* | 5/2010 | Nakagawa | G01S 3/74 342/157 |
| 2010/0271254 A1* | 10/2010 | Kanamoto | G01S 3/74 342/27 |
| 2012/0293359 A1* | 11/2012 | Fukuda | G01S 3/48 342/107 |

(Continued)

FOREIGN PATENT DOCUMENTS

| | | |
|---|---|---|
| JP | 2008-170323 A | 7/2008 |
| WO | 2015/190283 A1 | 12/2015 |

OTHER PUBLICATIONS

Extended European Search Report, dated Jul. 31, 2017, for the related European Patent Application No. 17158270.3-1812, 7 pages.

*Primary Examiner* — Timothy X Pham
(74) *Attorney, Agent, or Firm* — Seed IP Law Group LLP (57) ABSTRACT

Frequency analysis of each of a plurality of reception antennas and each of reception signals received by the plurality of reception antennas is performed, a power spectrum is calculated for each of the reception antennas, a standard deviation indicating a degree of conformity in a peak of the power spectrum among the plurality of reception antennas is calculated, the power spectra are corrected with use of the standard deviation, a peak is detected based on the corrected power spectra, and a target object is detected based on the detected peak.

8 Claims, 10 Drawing Sheets

(56) References Cited

U.S. PATENT DOCUMENTS

2014/0292558 A1\* 10/2014 Asanuma ............... G01S 7/354
342/128
2015/0338506 A1\* 11/2015 Yukumatsu ............. G01S 7/40
342/27
2017/0102459 A1 4/2017 Sakamoto et al.

\* cited by examiner

RADAR APPARATUS AND TARGET OBJECT DETECTION METHOD

BACKGROUND

1. Technical Field

The present disclosure relates to a radar apparatus and a target object detection method in which objects existing nearby may be detected without false detection with use of results of measurement by the radar apparatus.

2. Description of the Related Art

In recent years, vehicles in which radar apparatuses that detect other vehicles, pedestrians, bicycles, motorcycles, or installations on roads existing around the vehicles are installed have been increasing. An in-vehicle radar apparatus detects an object coming nearer from front or a side of a host vehicle and measures a relative position of the object with respect to the host vehicle or a relative velocity of the object with respect to the host vehicle. The in-vehicle radar apparatus determines whether there is a possibility of a collision between the host vehicle and the object, based on results of such measurement. In a case where the radar apparatus determines that there is the possibility, the radar apparatus gives a driver a warning or avoids the collision by controlling driving of the host vehicle.

Meanwhile, systems have been developed that monitor or manage road traffic with use of radar apparatuses installed adjacent to roads. The systems detects vehicles or pedestrians passing through intersections, by radar apparatuses installed adjacent to the intersections, for instance, or adaptively controls traffic lights by measuring traffic flow. In a case where the systems determines that there is a possibility of a collision among a plurality of objects, such as a vehicle and a pedestrian, on a road, the system gives drivers and/or pedestrians warnings and tries to avoid the collision among the plurality of objects.

As another method of utilizing radar apparatuses, there is an example in which radar apparatuses are installed in order to monitor an airport or other facilities, for instance. Such radar apparatuses detect objects coming from sky or on ground, provide information on the objects to associated security systems, and thereby check intrusions of the objects.

Thus radar apparatuses are used in order to detect objects in various situations. When particulate obstacles exist around the radar apparatuses, for instance, in conditions of rainfall or snowfall or environments where mist, dust, sand, withered leaves, or the like exists, however, detection accuracy for the objects is decreased by undesired reflection echoes from such particulates. As technology to deal with such situations, Japanese Unexamined Patent Application Publication No. 2008-170323 discloses technology that improves the detection accuracy for a target object in the conditions of rainfall or snowfall by extending integrating time for radar signals in comparison with that in conditions of non-rainfall or non-snowfall.

SUMMARY

In the technology disclosed in Japanese Unexamined Patent Application Publication No. 2008-170323 described above, however, detection time is also extended because the integrating time for the radar signals is extended in comparison with that in the conditions of non-rainfall or non-snowfall. In some applications of radar apparatuses, it may be difficult to extend the integrating time and it is then difficult to apply the technology disclosed in Japanese Unexamined Patent Application Publication No. 2008-170323 to such applications.

One non-limiting and exemplary embodiment facilitates providing a radar apparatus and a target object detection method by which detection accuracy for a target object in conditions of rainfall or snowfall may be improved without extension of the detection time.

In one general aspect, the techniques disclosed here feature a radar apparatus including: a plurality of reception antennas, which in operation, each receive one or more reflected waves resulting from reflection of one or more radar transmission signals by one or more objects to output one or more reception signals; a plurality of frequency analysis processing circuitry, which in operation, performs frequency analysis of each of the plurality of reception signals received respectively by the plurality of reception antennas to acquire a frequency characteristic of each of the plurality of reception antennas; conformity calculation circuitry, which in operation, calculates a conformity indicator which indicates a degree of conformity in a peak of each of the frequency characteristics between each of the plurality of reception antennas based on the frequency characteristics of the plurality of reception antennas; a plurality of peak detection circuitry, which in operation, correct the frequency characteristics of the plurality of reception antennas with use of the conformity indicator and detect a peak satisfying a specified condition from the corrected frequency characteristics; and object detection circuitry, which in operation, detects a target object from among the one or more objects based on the detected peak.

It should be noted that general or specific embodiments may be implemented as a system, a method, an integrated circuit, a computer program, a storage medium, or any selective combination thereof.

According to one aspect of the present disclosure, detection accuracy for a target object in the conditions of rainfall or snowfall may be improved without extension of the detection time.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

When particulate obstacles exist around a radar apparatus, for instance, in conditions of rainfall or snowfall or an environment where mist, dust, sand, withered leaves, or the like is present, detection accuracy for objects is decreased by undesired reflection echoes from such particulates.

For instance, a radar apparatus in which radar transmitted waves with a high frequency (radio frequency) or a short wavelength are used is greatly influenced by the undesired reflection echoes from such particulates because sizes of the particulates are relatively greater in comparison with the radar wavelength.

In the technology disclosed in Japanese Unexamined Patent Application Publication No. 2008-170323 described above, for instance, the integrating time for radar received signals in the conditions of rainfall, snowfall, mist, or high humidity is set longer in comparison with that in the conditions of non-rainfall or non-snowfall, so that increase in signal-to-noise ratio (SNR) and improvement in detection capability for a target object are attained.

In use of a radar apparatus for monitoring application, for instance, however, it is desirable for time required for one scan of a monitored area to be short. Besides, time during which irradiation in one direction is allowed or maximum integrating time for radar received signals may be restricted in accordance with specifications required for a radar apparatus. Therefore, it may be difficult to extend the integrating time for radar received signals in the conditions of rainfall or snowfall as in the technology disclosed in Japanese Unexamined Patent Application Publication No. 2008-170323.

In view of such circumstances, non-limiting embodiments of the present disclosure provide radar apparatuses and target object detection methods that enable accurate detection of objects around even if particulate obstacles exist around the radar apparatuses.

Hereinbelow, the embodiments of the present disclosure will be described in detail with reference to the drawings.

First Embodiment

[Configuration Example of Radar Apparatus 100]

Figure 1:
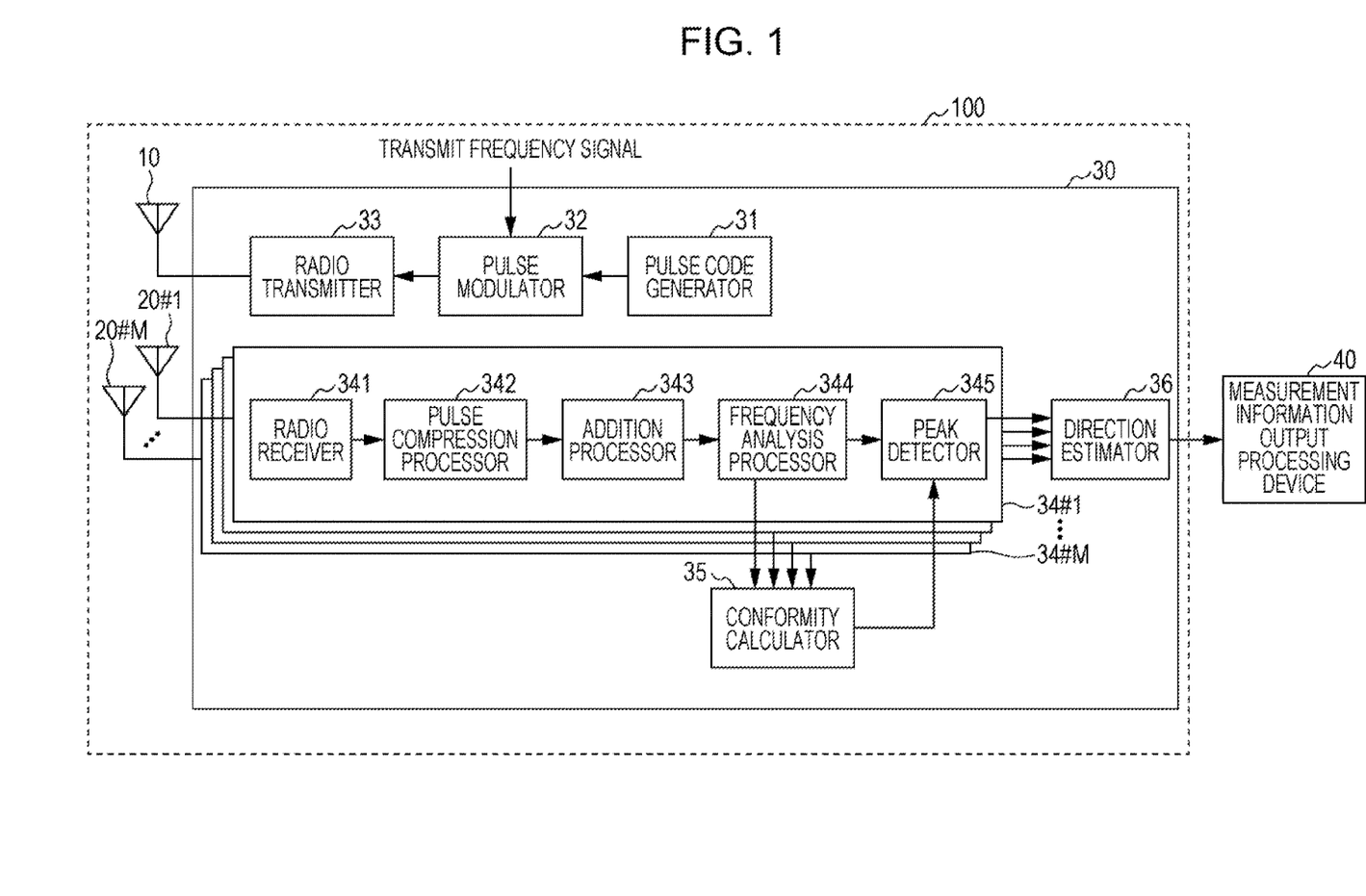
FIG. 1 is a diagram illustrating an example of a configuration of a radar apparatus according to a first embodiment of the present disclosure.

FIG. 1 is a block diagram illustrating an example of a configuration of a radar apparatus 100 according to a first embodiment of the present disclosure. In FIG. 1, the radar apparatus 100 according to the first embodiment of the present disclosure includes a transmission antenna 10, a plurality of reception antennas 20#1 to 20#M (M is an integer of 2 or greater), and a radar signal processing device 30. A measurement information output processing device 40 exists outside the radar apparatus 100. As the radar apparatus 100 according to the first embodiment of the present disclosure, a pulse compression radar based on a phase-coded modulation scheme is assumed in which discrete phase modulation is carried out using code sequences and in which pulse compression is carried out during reception by correlation processing of code sequences.

The transmission antenna 10 transmits radar transmission signals, generated by the radar signal processing device 30, to ambient space. When an object exists around the radar apparatus 100, the radar transmission signals are reflected by the object around and the radar apparatus 100 receives resultant reflected waves. The reception antennas 20#1 to 20#M receive the reflected waves and then output reception signals.

The reception antennas 20#1 to 20#M are array antennas each having a plurality of antenna elements, for instance. In the present disclosure, however, there are no particular limitations on a shape and an arrangement of the array antennas. The antenna shape of the reception antennas 20#1 to 20#M may be linear, planar, or curved. The arrangement of the reception antennas 20#1 to 20#M may be regular or irregular. In description on the embodiments below, the reception antennas 20#1 to 20#M numbering in M may collectively be referred to as reception antennas 20.

Though the transmission antenna 10 and the reception antennas 20#1 to 20#M are illustrated as separate bodies in FIG. 1, the antennas may be an integrated body.

The radar signal processing device 30 processes the reception signals acquired from the reception antennas 20 and carries out calculation of a distance from the radar apparatus 100 to the object and a Doppler frequency, direction-of-arrival estimation, and the like, based on the reception signals. On condition that the radar apparatus 100 is placed in an environment where particulate obstacles such as rain, snow, mist, dust, sand, and withered leaves exist, the radar signal processing device 30 further performs processing for removing influence of the undesired reflection echoes caused by the particulates from the reception signals and for accurately detecting the target object. Details of operation of the radar signal processing device 30 will be described later.

The measurement information output processing device 40 performs imaging processes, type identification processing, and/or the like for the target object and produces output information from the whole radar based on information such as the distance from the radar apparatus 100 to the target object, the Doppler frequency, and a direction outputted by the radar signal processing device 30. Related arts may be applied to the processing in the measurement information output processing device 40 and description on the processing is omitted for the embodiment.

[Configuration Example of Radar Signal Processing Device 30]

Subsequently, configurations and operation of the configurations of the radar signal processing device 30 will be described in detail. In FIG. 1, the radar signal processing device 30 includes a pulse code generator 31, a pulse modulator 32, a radio transmitter 33, reception signal processors 34#1 to 34#M, a conformity calculator 35, and a direction estimator 36.

Figure 2A:
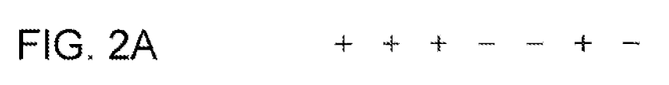
FIG. 2A is a diagram illustrating an example of a code sequence a pulse code generator generates in a radar signal processing device according to the first embodiment.
Figure 2B:
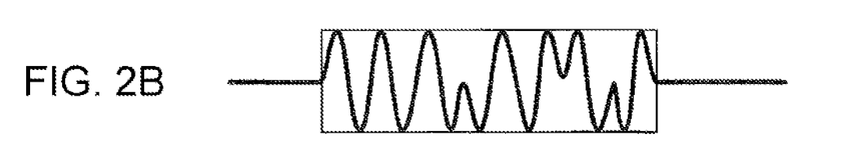
FIG. 2B is a diagram illustrating an example of a result of phase modulation carried out by a pulse modulator in the radar signal processing device according to the first embodiment.

The pulse code generator 31 generates code sequences for phase modulation. FIGS. 2A and 2B are diagrams illustrating an example of pulse codes that are used for transmission in the radar signal processing device 30 according to the first embodiment. FIG. 2A is the diagram illustrating an example of a code sequence the pulse code generator 31 generates. Barker codes or the like may be used as the code sequence the pulse code generator 31 generates, for instance. In FIG. 2A, a 7-bit code sequence is illustrated as the example. In FIG. 2A, plus code designates phase 0 and minus code designates phase π.

FIG. 2B is the diagram illustrating an example of a result of the phase modulation carried out by the pulse modulator 32. The pulse modulator 32 pulses high-frequency transmission signals, that is, carrier frequency signals and modulates phases of the high-frequency transmission signals in a pulse period based on the code sequences inputted from the pulse code generator 31. In FIG. 2B, a rectangle represents the pulse period and a frequency of signals in the rectangle is a transmit frequency.

The radio transmitter 33 carries out D/A conversion, power amplification, transmit beamforming, and/or the like for the pulse signals having undergone phase-coded modulation, as necessary, generates the radar transmission signals, and outputs the radar transmission signals to the transmission antenna 10.

The reception signal processors 34#1 to 34#M acquire the reception signals received respectively by the reception antennas 20#1 to 20#M, process the reception signals, and output the reception signals to the conformity calculator 35 and the direction estimator 36. The reception signal processors 34#1 to 34#M each include a radio receiver 341, a pulse compression processor 342, an addition processor 343, a frequency analysis processor 344, and a peak detector 345. In the description on the embodiments below, the reception signal processors 34#1 to 34#M may collectively be referred to as reception signal processors 34.

The radio receiver 341 amplifies the reception signals received by any of the reception antennas 20#1 to 20#M, carries out intermediate frequency (IF) conversion, A/D conversion, and/or the like for the signals, as necessary, and outputs the signals to the pulse compression processor 342.

Figure 3A:
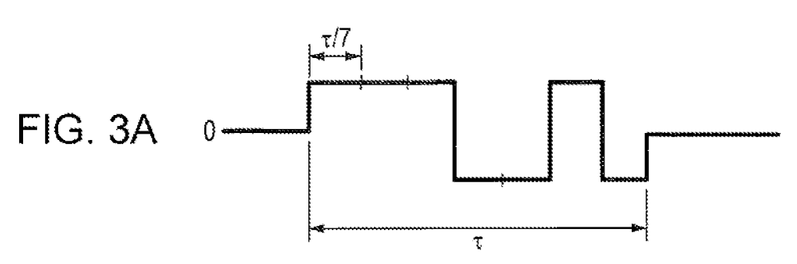
FIG. 3A is a diagram illustrating an example of a result of phase synchronous detection carried out by a pulse compression processor in the radar signal processing device.
Figure 3B:
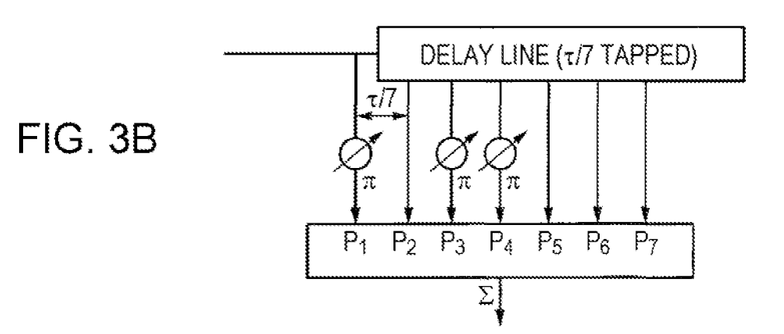
FIG. 3B is a diagram illustrating an example of a pulse compression circuit the pulse compression processor in the radar signal processing device includes.
Figure 3C:
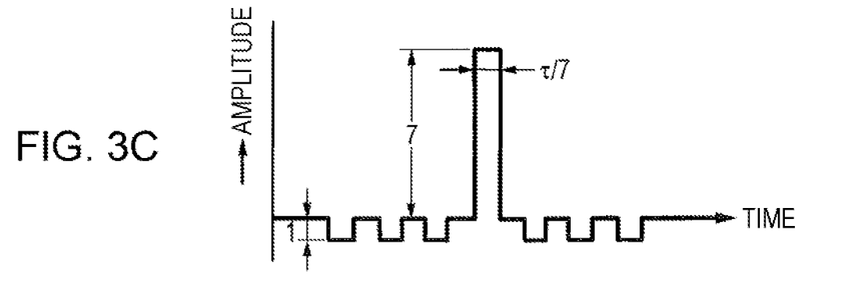
FIG. 3C is a diagram illustrating an example of output of a synthesizer Σ resulting from a signal of FIG. 3A in the radar signal processing device.

The pulse compression processor 342 carries out phase synchronous detection (I/Q detection) for the reception signals inputted from the radio receiver 341 and thereby reproduces phases of the reception signals. FIGS. 3A, 3B, and 3C are diagrams for description on pulse compression in the radar signal processing device 30. FIG. 3A is the diagram illustrating an example of a result of the phase synchronous detection carried out by the pulse compression processor 342. In FIG. 3A, positive width represents phase 0 and negative width represents phase π.

FIG. 3B is the diagram illustrating an example of a pulse compression circuit the pulse compression processor 342 includes. In FIG. 3B, the pulse compression circuit includes a tapped delay line and a synthesizer Σ. In the delay line illustrated in FIG. 3B, delay time for each tap is equal to a length obtained by division of a pulse width by a code length for modulation. When the pulse width is τ, the delay time for each tap is τ/7 because the code length for modulation is "7" in FIG. 3A.

The pulse compression processor 342 confirms a polarity at time when each tap signal is inputted into the synthesizer Σ, based on the code generated by the pulse code generator 31. On condition that the pulse code generator 31 has generated a code sequence "+++−−+−" in FIG. 2A, for instance, specifically, the pulse compression processor 342 preferably sets the polarities at the time of input to be "−−−++−+" in reversed order. As illustrated in FIG. 3B, output of the synthesizer Σ is sum of inputs P1 to P7.

FIG. 3C is the diagram illustrating the output of the synthesizer Σ resulting from a signal of FIG. 3A. In FIG. 3C, the output of the synthesizer Σ has undergone the pulse compression to τ/7 that is one seventh of the width τ of a transmitted pulse and extension in amplitude to seven times. The output of the synthesizer Σ that is illustrated in FIG. 3C represents reflection echoes from the target object and a pulse having a high amplitude therein indicates existence of the target object. Thus the distance from the radar apparatus 100 to the target object may be calculated based on time when the pulse appears.

The pulse compression radar of FIG. 3C, in which the pulse width of the reception signals is compressed to one part in "code length for modulation" of the pulse width of the transmission signals, increases range resolution in comparison with pulse radars in which no compression is performed. Though the code length for modulation is 7 in FIGS. 3A to 3C, this value is an example and there is no particular limitation on the code length for modulation in the present disclosure.

The addition processor 343 integrates the reflection echoes in the same direction with reference to the radar apparatus 100 for every specified number. The specified number is an integer of 1 or greater and there is no particular limitation on the addition number of integration that is performed by the addition processor 343 in the present disclosure. Increase in the number of times the addition processor 343 performs an addition process may improve signal-to-noise ratio (SNR) with respect to the reception signals, though deteriorating real-time performance (immediate response). Therefore, the addition number is preferably set at such a value as satisfies both the SNR and the real-time performance at desired levels.

Figure 4:
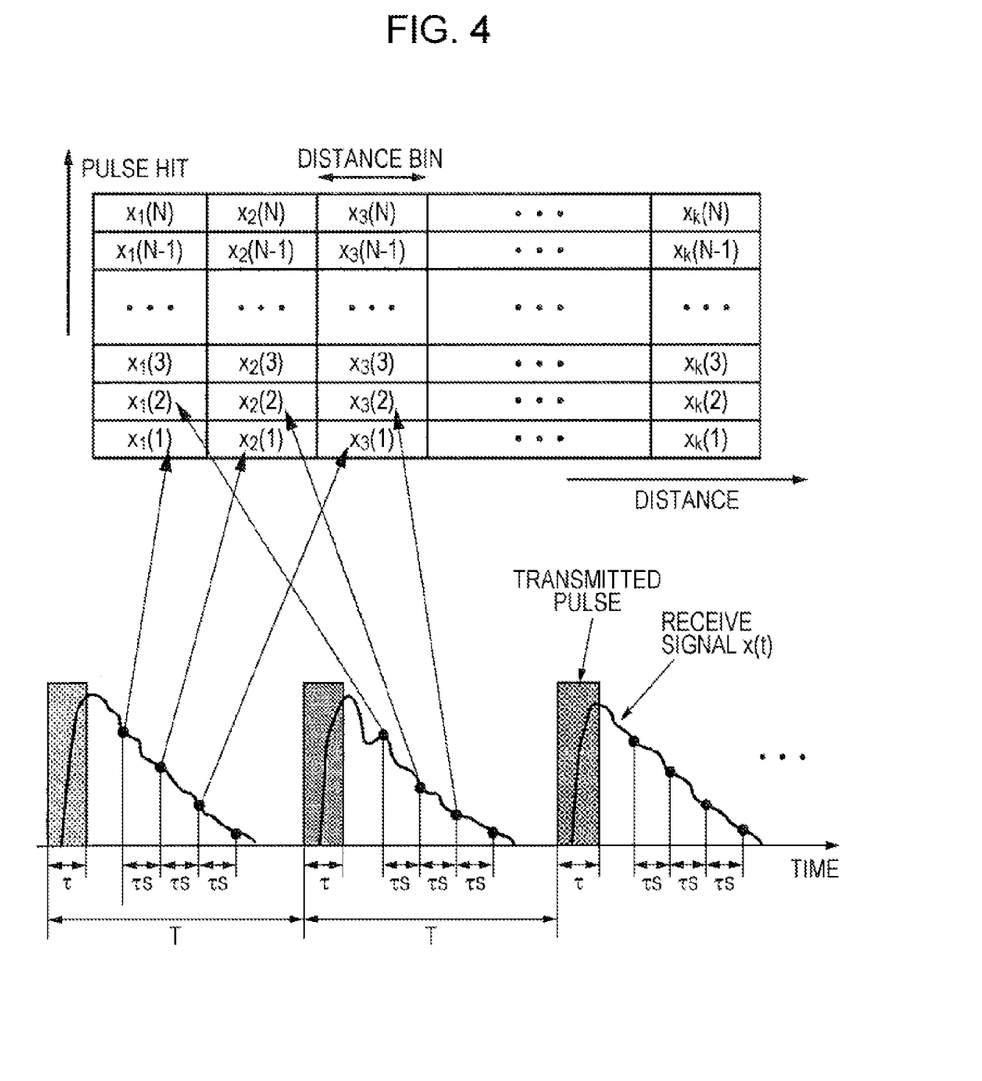
FIG. 4 is a diagram illustrating frequency characteristic acquisition processing a frequency analysis processor performs.

The frequency analysis processor 344 performs Fourier transform of a plurality of reflection echo values existing in the same spatial position, that is, in the same direction and at the same distance with reference to the radar apparatus 100 and thereby calculates frequency characteristics of the reception signals. Hereinbelow, description will be given with reference to specific examples. FIG. 4 is a diagram for description on frequency characteristic acquisition processing the frequency analysis processor 344 performs.

In FIG. 4, it is assumed that the transmitted pulse illustrated in FIGS. 2A and 2B is transmitted for transmission cycles T numbering in N in the same direction with reference to the radar apparatus 100 and that the reception signal illustrated in FIGS. 3A to 3C is received. That is, in FIG. 4, the transmitted pulse is a code-modulated pulse illustrated as the example in FIG. 2B and the reception signal x(t) is a compressed signal illustrated in FIG. 3C. τs illustrated in FIG. 4 represent a pulse width of the reception signals. That is, τs in FIG. 4 and τ/7 in FIG. 3C represent the same length of time.

FIG. 4 illustrates an example in which one transmitted pulse exists within one transmission cycle T. Provided that a plurality of transmitted pulses are transmitted within one transmission cycle T, however, the addition processor 343 makes addition of the reception signals and thus makes a result of the addition the reception signal x(t).

In FIG. 4, τs corresponds to the range resolution of the radar. Distance samplings of τs will be referred to as distance bins. The example illustrated in FIG. 4 includes the distance bins numbering in K. Signals that correspond to each distance bin and that number in N will be referred to pulse hits.

The frequency analysis processor 344 performs Fourier transform of each distance bin with use of Equation (1) below.

$$X_k(f) = \sum_{t=1}^{N} x_k(t) e^{-i2\pi t f/N} \quad (1)$$

In Equation (1), k denotes a distance bin and is an integer of 1 or greater and K or smaller. Therein, f is a frequency. The frequency analysis processor 344 calculates a power spectrum $P_k(f)$ for each distance bin with use of Equation (2) below.

$$P_k(f) = \|X_k(f)\|^2 \quad (2)$$

The peak detector 345 adjusts the power spectrum for each of the reception antennas 20#1 to 20#M, based on a conformity indicator the conformity calculator 35 that will be described later calculates, and finds a frequency corresponding to an adjusted peak position. Details of processing by the peak detector 345 will be stated after description on processing by the conformity calculator 35.

The conformity calculator 35 acquires the power spectra $P_k(f)$ from the frequency analysis processors 344 the reception signal processors 34#1 to 34#M respectively include and calculates the conformity indicator that is a degree of conformity among the plurality of reception signals acquired from the plurality of reception antennas 20 by comparison among the power spectra $P_k(f)$. A standard deviation among the reception signals may be used as the conformity indicator, for instance.

The conformity calculator 35 calculates the standard deviation σ(f) among the plurality of reception signals acquired from the plurality of reception antennas 20 with use of Equation (3) below.

$$\sigma(f) = \sqrt{\frac{1}{M} \sum_{m=1}^{M} (P_{k,m}(f) - \mu_k(f))^2} \quad (3)$$

In Equation (3), $P_{k,m}(f)$ is the power spectrum for the m-th (m=1, . . . , M) reception antenna 20. Therein, $\mu_k(f)$ is an average of $P_{k,m}(f)$ and is calculated with use of Equation (4) below.

$$\mu_k(f) = \frac{1}{M} \sum_{m=1}^{M} P_{k,m}(f) \quad (4)$$

Figure 5A:
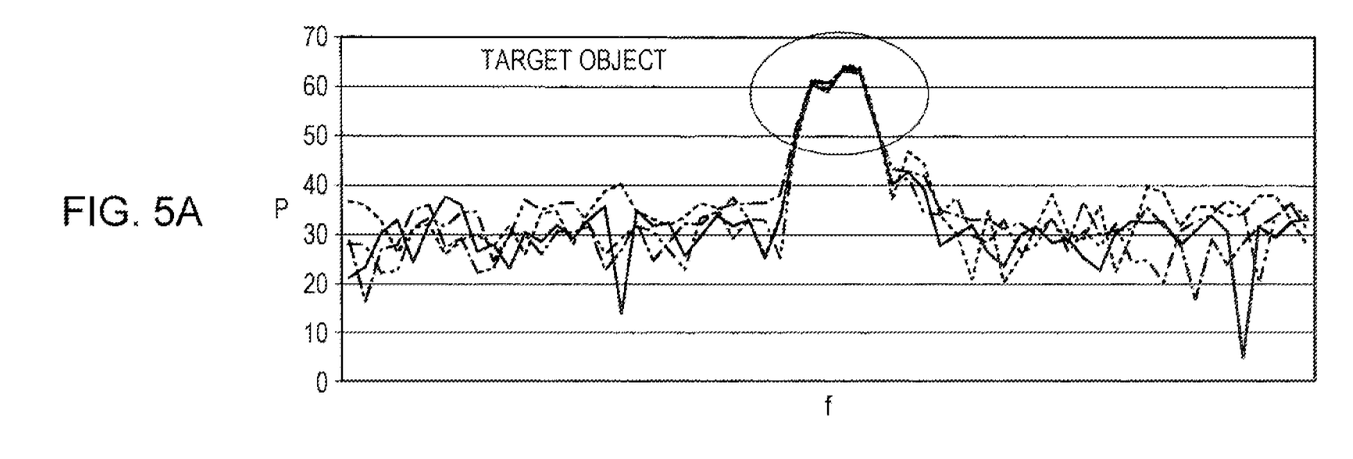
FIG. 5A is a diagram illustrating an example of power spectra for reception antennas that have received reflected waves from a target object.
Figure 5B:
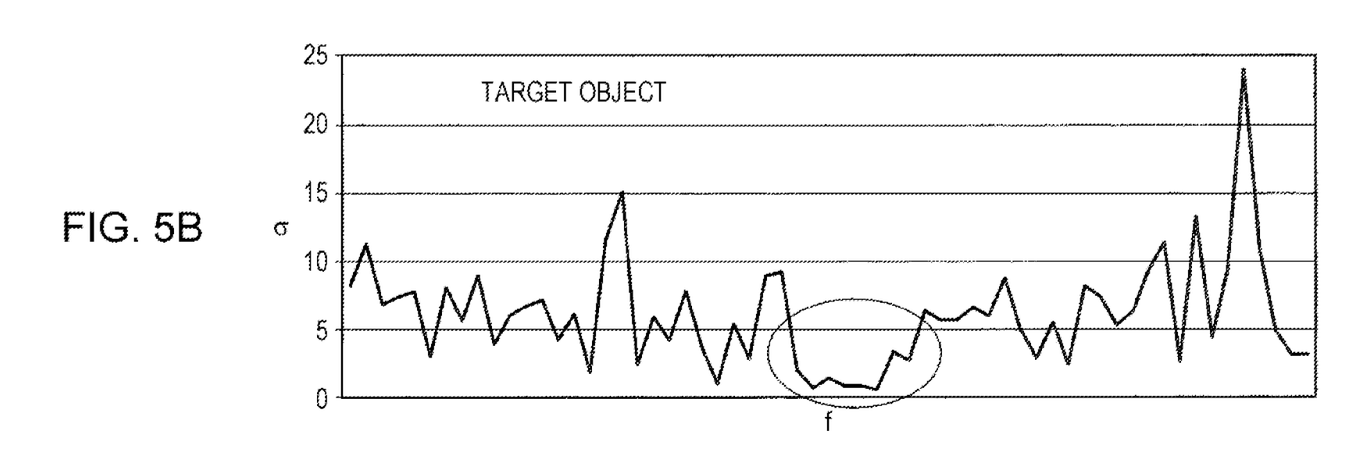
FIG. 5B is a diagram illustrating an example of a standard deviation of the power spectra for the reception antennas that have received the reflected waves from the target object.
Figure 6A:
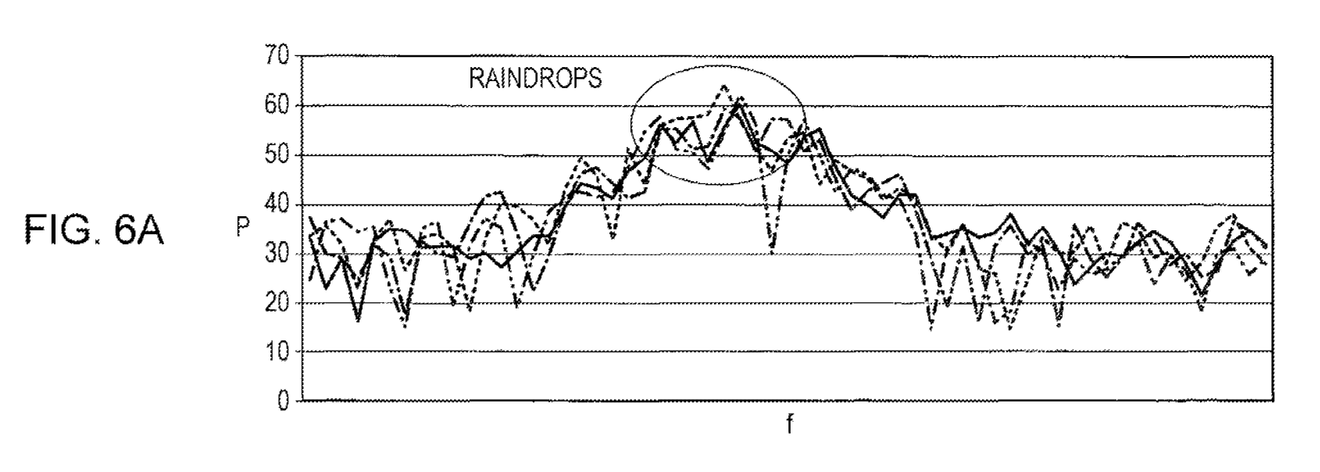
FIG. 6A is a diagram illustrating an example of power spectra for reception antennas that have received reflected waves from raindrops as an example of particulate obstacles.
Figure 6B:
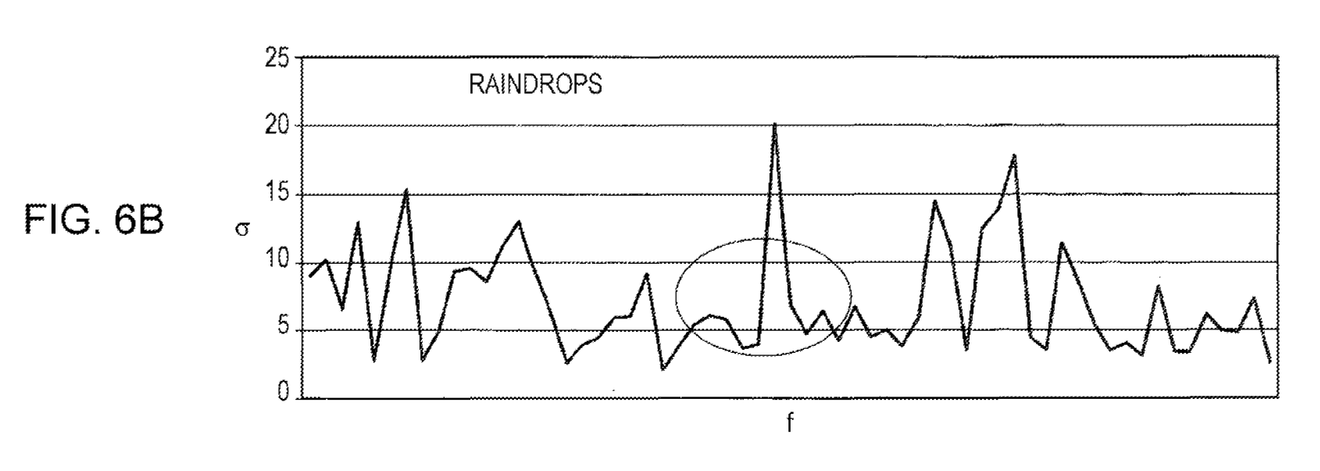
FIG. 6B is a diagram illustrating an example of a standard deviation of the power spectra for the reception antennas that have received the reflected waves from the raindrops as the example of the particulate obstacles.

FIGS. 5A and 5B are diagrams illustrating an example of the power spectra for the reception antennas that have received the reflected waves from the target object. FIG. 5A is the diagram illustrating the example of the power spectra for four reception antennas that have received the reflected waves from the target object and FIG. 5B is the diagram illustrating the standard deviation in the power spectra for the four reception antennas that have received the reflected waves from the target object. FIGS. 6A and 6B are diagrams illustrating an example of the power spectra for the reception antennas 20#1 to 20#M that have received reflected waves from raindrops as an example of the particulate obstacles. FIG. 6A is the diagram illustrating the example of the power spectra for four reception antennas that have received the reflected waves from the raindrops and FIG. 6B is the diagram illustrating the standard deviation among the power spectra for the four reception antennas that have received the reflected waves from the raindrops.

In comparison between FIG. 5A and FIG. 6A, and in comparison between FIG. 5B and FIG. 6B, the target object illustrated in FIG. 5B provides smaller standard deviation than the raindrops illustrated in FIG. 6B does, adjacent to the peak positions (encircled parts in FIGS. 5A, 5B, 6A, and 6B) of the power spectra. This means that the reception antennas having received the reflected waves from the target object provide the smaller standard deviation, that is, higher conformity in the power spectra than the reception antennas having received the reflected waves from the raindrops.

That is, when such target objects as pedestrians and vehicles exist in a spatial extent where the transmission signals from the transmission antenna 10 may reach, small scattering in reflected beams leads to general conformity among the positions (frequencies) of peaks of the power spectra based on the reflected waves received by the reception antennas 20#1 to 20#M. When such particulate obstacles as raindrops exist in the spatial extent where the transmission signals from the transmission antenna 10 may reach, however, increased scattering in the reflected beams leads to nonconformity among the positions of the peaks of the power spectra based on the reflected waves received by the reception antennas 20#1 to 20#M.

Thus the conformity indicator (the standard deviation among the power spectra of the reception antennas in the example described above) the conformity calculator 35 calculates is outputted to the peak detector 345. The peak detector 345 adjusts the power spectrum of each of the reception antennas based on the conformity indicator and identifies the peak position corresponding to the target object, based on the adjusted power spectrum.

Though there is no particular limitation in the present disclosure on a method in which the peak detector 345 adjusts the power spectrum, such adjustment may be performed in a method as follows, for instance. In the method, the peak detector 345 calculates the adjusted power spectrum $Q_{k,m}(f)$ with use of Equation (5) below. That is, the power spectra for reception antennas with low conformity are attenuated.

$$Q_{k,m}(f) = P_{k,m}(f) - \alpha\sigma(f) \quad (5)$$

In Equation (5), a is an arbitrary coefficient.

Though the standard deviation among the power spectra is used in the above description as the conformity indicator the peak detector 345 calculates, the present disclosure is not limited thereto. For instance, variance among the power spectra may be used as the conformity indicator.

Figure 7A:
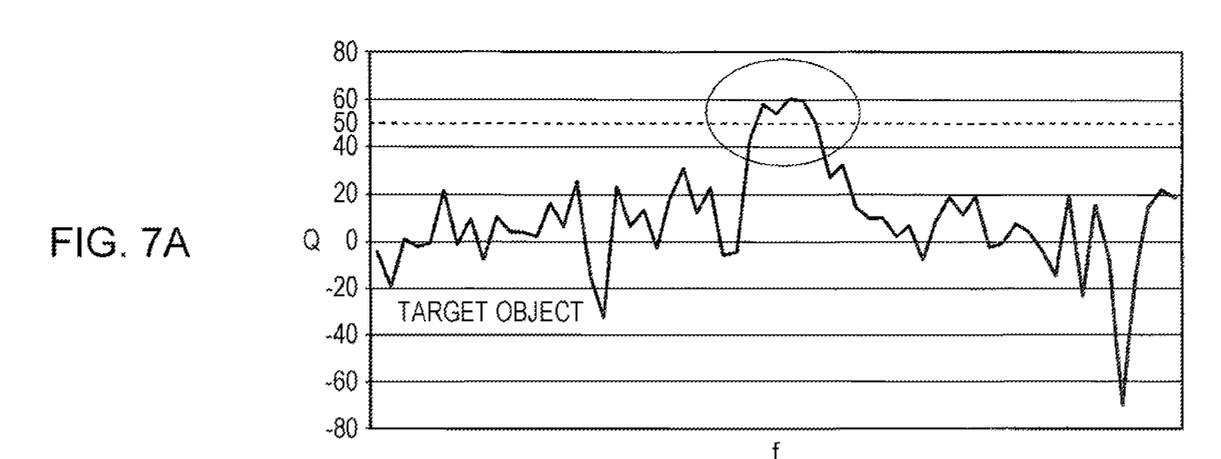
FIG. 7A is a diagram illustrating an example of an adjusted power spectrum for the reception antennas that have received the reflected waves from the target object.

The peak detector 345 detects the peak corresponding to the target object, based on the adjusted power spectrum. FIG. 7A is a diagram illustrating a graph after the adjustment of the power spectra of the reception antennas that have received the reflected waves from the target object (which will be referred to as power spectra for the target object, hereinbelow) and FIG. 7B is a diagram illustrating a graph after the adjustment of the power spectra for the reception antennas that have received the reflected waves from raindrops as an example of the particulate obstacles (which will be referred to as power spectra for raindrops, hereinbelow).

Figure 7B:
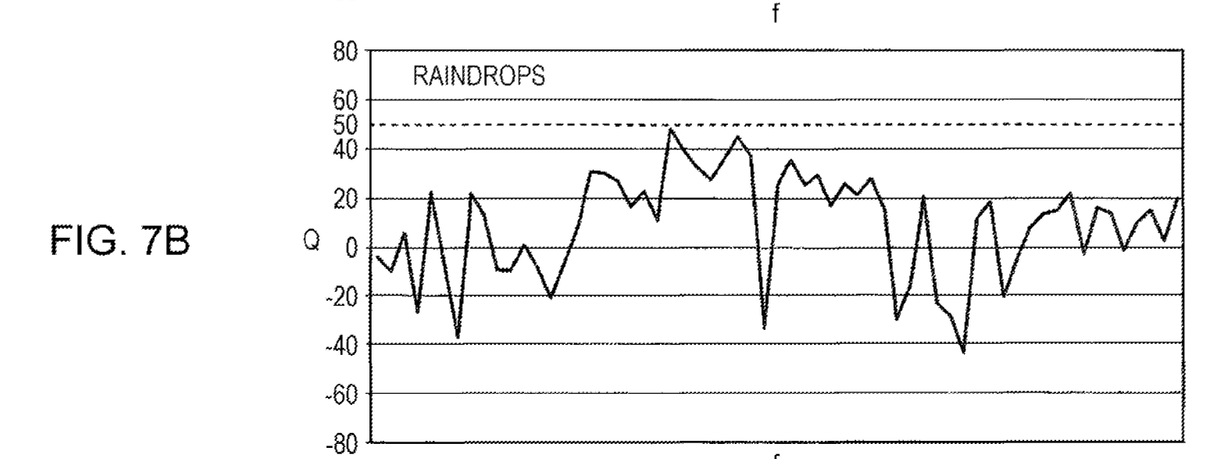
FIG. 7B is a diagram illustrating an example of an adjusted power spectrum for the reception antennas that have received the reflected waves from the raindrops.

In comparison between FIG. 7A and FIG. 7B, a value of the peak (encircled part) of the power spectra for the target object is higher than a value of the peak of the power spectra for raindrops. This is because existence of raindrops results in the increased scattering in the reflected waves and because nonexistence of raindrops results in decreased scattering in the reflected waves, as described above. Therefore, the peak detector 345 determines that the peak has been caused by the target object, in a case where the corrected power spectra exceed a specified threshold, or determines that the peak has not been caused by the target object, even though the peak exists, in a case where the corrected power spectra do not exceed the specified threshold.

In a case where dashed lines illustrated in FIGS. 7A and 7B, that is, Q=50 is assumed as the specified threshold, as a specific example for description, the peak of the power spectra for the target object illustrated in FIG. 7A exceeds the threshold, while the peak of the power spectra for raindrops illustrated in FIG. 7B does not exceed the threshold. Such setting in advance of the specified threshold that is smaller than the peak of the power spectra for the target object and that is greater than the peak of the power spectra for raindrops makes it possible for the peak detector 345 to extract the peak caused by the target object, while excluding the peak caused by such particulate obstacles as raindrops, based on the adjusted power spectra. The specified threshold may experimentally be set in advance with use of various target objects and particulate obstacles, for instance.

The peak detector 345 calculates a frequency corresponding to the peak position exceeding the specified threshold in the adjusted power spectra. The frequency is the Doppler frequency of the target object. Thus the peak detector 345 is capable of calculating a Doppler velocity of the target object by calculating the Doppler frequency of the target object.

Subsequently, the direction estimator 36 estimates a direction of arrival of the reflected waves, based on the frequency calculated by the peak detector 345 and corresponding to the peak position of the power spectrum of each of the reception antennas 20#1 to 20#M. This enables identification of a direction of the target object with reference to the radar apparatus 100. There is no particular limitation in the present disclosure on a method of estimating the direction of arrival of the reflected waves. A known method of estimating a direction of arrival, such as Capon method, may be used.

As described above, the information, such as the distance to the target object, the Doppler velocity, and the direction of the target object, generated by the radar signal processing device 30 is outputted to the measurement information output processing device 40. The measurement information output processing device 40 provides output in a form that may easily be used by a user (such as display of a map illustrating a positional relation between the radar apparatus 100 and the target object, and numerical display of the distance, a relative velocity, and the like) based on the information. Known arts may be used for processing that is performed by the measurement information output processing device 40.

As described above, the radar apparatus according to the first embodiment of the present disclosure makes frequency analysis of each the plurality of reception antennas and each of the reception signals received by the plurality of reception antennas, calculates the power spectrum for each of the reception antennas, calculates the standard deviation indicating the degree of conformity among the peaks of the power spectra of the plurality of reception antennas, corrects the power spectra with use of the standard deviation, detects the peak based on the corrected power spectra, and detects the target object based on the detected peak.

Such a configuration makes it possible for the radar apparatus according to the first embodiment of the present disclosure to remove the influence of such particulate obstacles as raindrops resulting in the increased scattering without extending the integrating time for the radar signals. This enables accurate detection of the target object without extension in the detection time for the target object.

Second Embodiment

While the pulse compression radar based on the phase-coded modulation scheme is assumed as the radar apparatus 100 according to the first embodiment described above, a pulse compression radar of chirp system is assumed as a radar apparatus 100a according to a second embodiment that will be described below. In the chirp system, a transmit frequency is linearly varied while pulses are transmitted.

Figure 8:
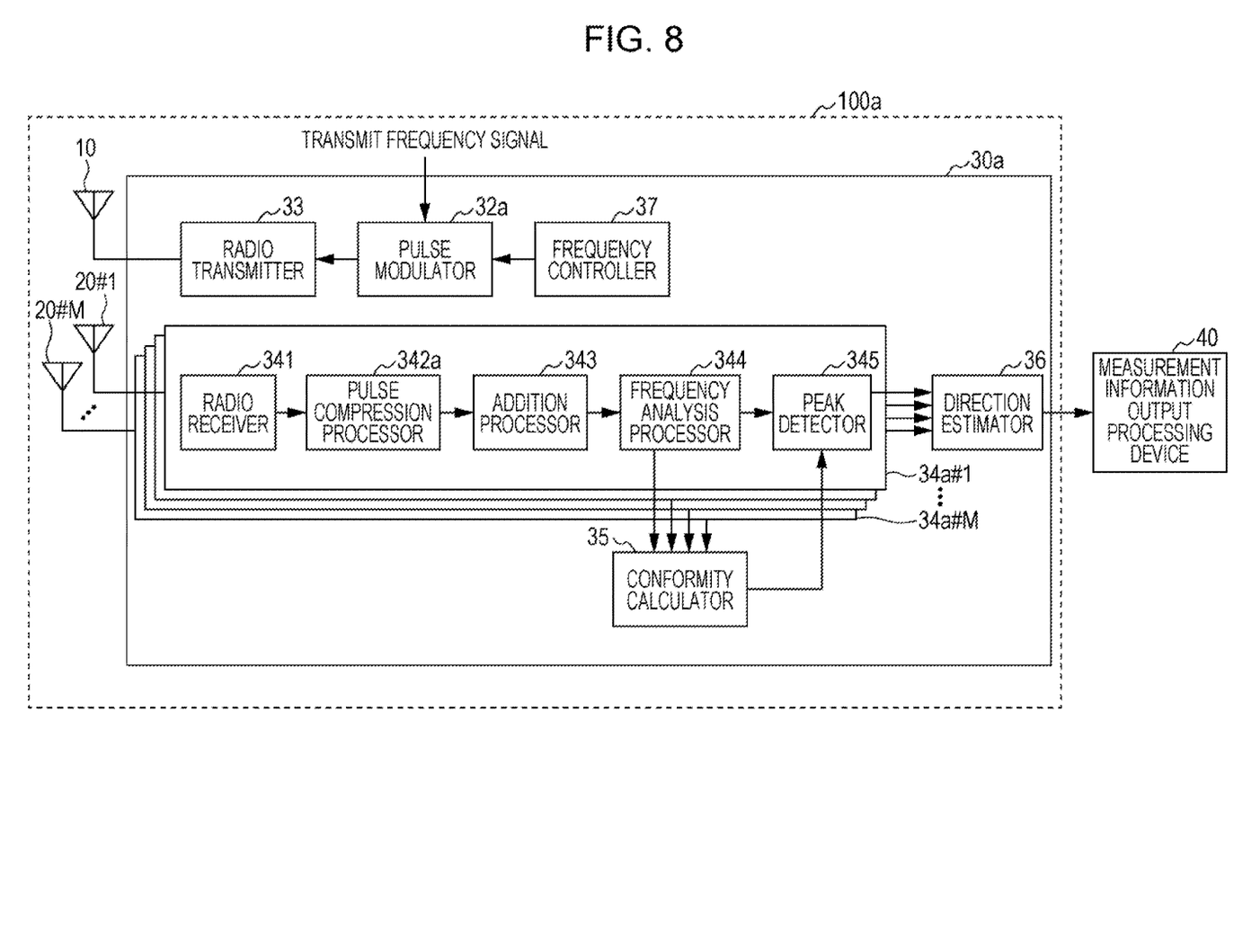
FIG. 8 is a block diagram illustrating an example of a configuration of a radar apparatus according to a second embodiment of the present disclosure.

FIG. 8 is a block diagram illustrating an example of a configuration of the radar apparatus 100a according to the second embodiment of the present disclosure. Configurations that are illustrated in FIG. 8 and that are common to those in FIG. 1 are designated by the same reference characters as in FIG. 1 and detailed description thereon is omitted. As illustrated in FIG. 8, the radar apparatus 100a according to the second embodiment includes a frequency controller 37 as a configuration different from the radar apparatus 100 according to the first embodiment. A pulse modulator 32a and a pulse compression processor 342a in a radar signal processing device 30a illustrated in FIG. 8 carry out operations different from those of the pulse modulator 32 and the pulse compression processor 342 in the radar signal processing device 30 illustrated in FIG. 1.

Figure 9A:
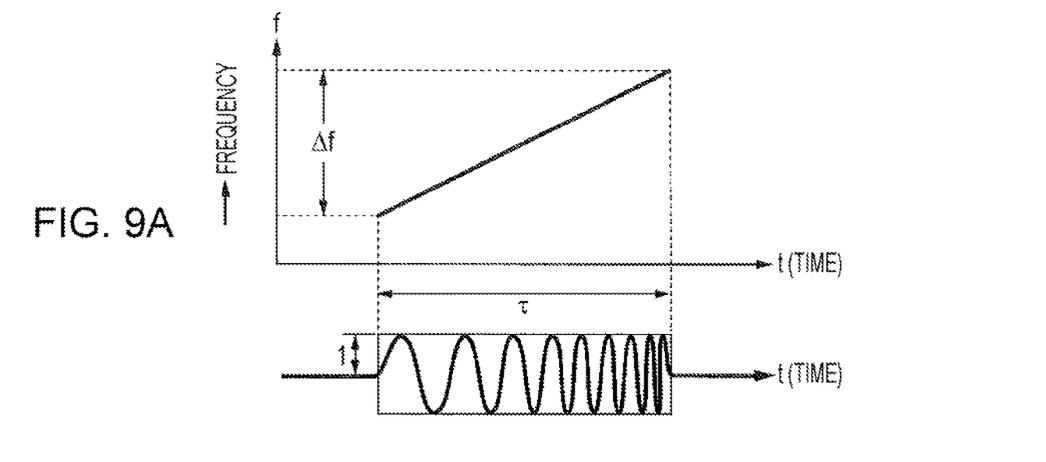
FIG. 9A is a diagram illustrating an example of pulse codes that are used in a pulse compression radar of chirp system.
Figure 9B:
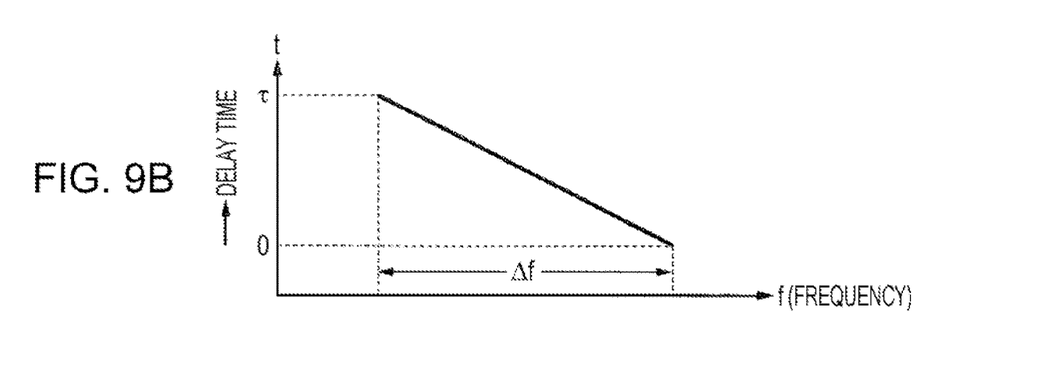
FIG. 9B is a diagram illustrating a frequency band/delay time characteristic of a pulse compression processor in the pulse compression radar of chirp system.
Figure 9C:
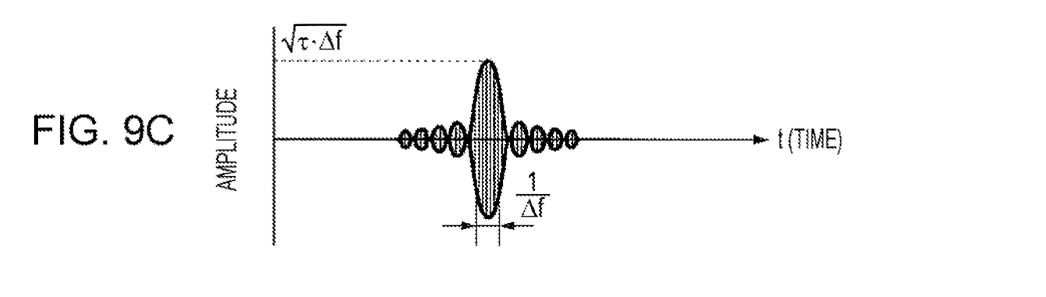
FIG. 9C is a diagram illustrating an example of a result of pulse compression processing carried out by the pulse compression processor in the pulse compression radar of chirp system.

The frequency controller 37 sets a frequency modulation range in which the pulse modulator 32a that will be described later carries out frequency modulation. FIGS. 9A to 9C are diagrams illustrating an example of pulse codes that are used in the pulse compression radar of chirp system. Upper part of FIG. 9A is the diagram illustrating a relation between the frequency modulation range and pulse width. In FIG. 9A, $\Delta f$ denotes the frequency modulation range and $\tau$ denotes the pulse width. As illustrated in FIG. 9A, the frequency controller 37 sets the frequency modulation range $\Delta f$ based on a carrier frequency so that the frequency may linearly vary in the pulse width $\tau$.

The pulse modulator 32a pulses high-frequency transmission signals (radio frequency transmission signals), that is, carrier frequency signals and thereafter carries out the frequency modulation that causes linear variation with respect to time in the frequency modulation range Δf set by the frequency controller 37. Lower part of FIG. 9A illustrates frequency modulation (FM) pulses that vary linearly. The pulse modulator 32a generates the FM pulses that vary linearly as illustrated in the lower part of FIG. 9A.

The pulse compression processor 342a carries out the phase synchronous detection (I/Q detection) for reception signals inputted from the radio receiver 341 and thereby reproduces the reception signals. FIG. 9B is the diagram illustrating a frequency band/delay time characteristic of the pulse compression processor 342a. The pulse compression processor 342a carries out pulse compression processing with use of a network having such a frequency band/delay time characteristic as illustrated in FIG. 9B. FIG. 9C is the diagram illustrating an example of a result of the pulse compression processing carried out by the pulse compression processor 342a. The pulse compression processing carried out by the pulse compression processor 342a results in concentration of a waveform dispersed in a time slot of the pulse width and a steep pulse compression waveform as illustrated in FIG. 9C. A signal illustrated in FIG. 9C is a reflection echo.

In the second embodiment, the frequency analysis processors 344, the conformity calculator 35, and the peak detectors 345 remove peaks of the power spectra of particulate obstacles and extract the peak of the power spectra of the target object by performing the same processing as in the first embodiment for the reflection echoes acquired by the pulse compression radar of chirp system. As a result, the Doppler velocity of the target object and the distance from the radar apparatus 100a to the target object may be calculated without extension in the detection time.

Third Embodiment

While the pulse compression radars are assumed as the radar apparatuses 100 (100a) according to the first and second embodiments described above, a continuous-wave radar of FMCW system is assumed as a radar apparatus 100b according to a third embodiment that will be described below. In the frequency modulated continuous wave (FMCW) system, continuous waves are transmitted and the distance, the relative velocity, and the like between the radar apparatus 100b and the target object are calculated based on differences in waveform between each of the transmitted waves and each of received waves.

Figure 10:
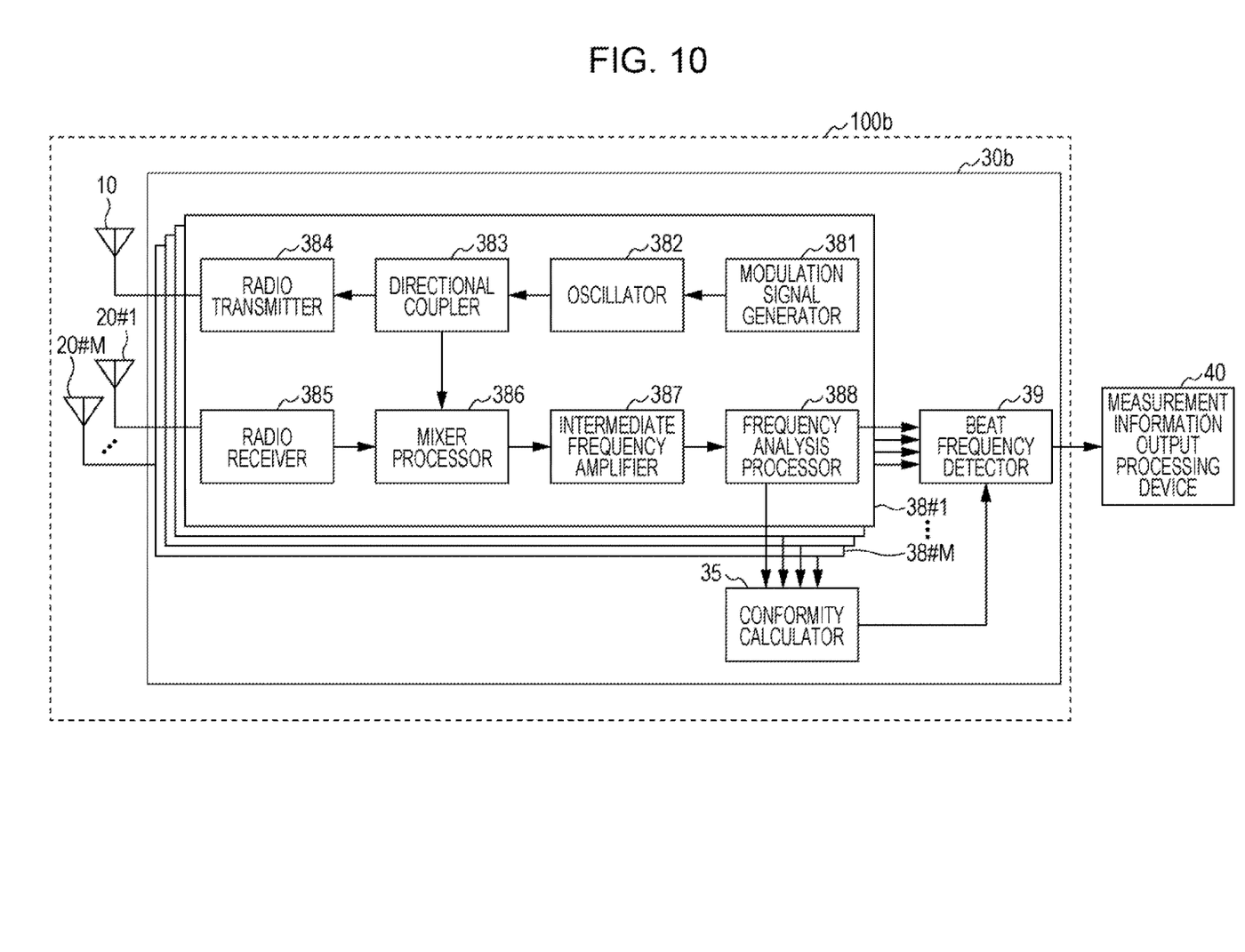
FIG. 10 is a diagram illustrating an example of a configuration of a radar apparatus according to a third embodiment of the present disclosure.

FIG. 10 is a block diagram illustrating an example of a configuration of the radar apparatus 100b according to the third embodiment of the present disclosure. Configurations that are illustrated in FIG. 10 and that are common to those in FIG. 1 are designated by the same reference characters as in FIG. 1 and detailed description thereon is omitted. As illustrated in FIG. 10, the radar apparatus 100b according to the third embodiment is different from the radar apparatus 100 according to the first embodiment in that a radar signal processing device 30b includes transmission/reception signal processors 38#1 to 38#M numbering in M and a beat frequency detector 39.

As illustrated in FIG. 10, the transmission/reception signal processors 38 numbering in M each include a modulation signal generator 381, an oscillator 382, a directional coupler 383, a radio transmitter 384, a radio receiver 385, a mixer processor 386, an intermediate frequency amplifier 387, and a frequency analysis processor 388.

Figure 11A:
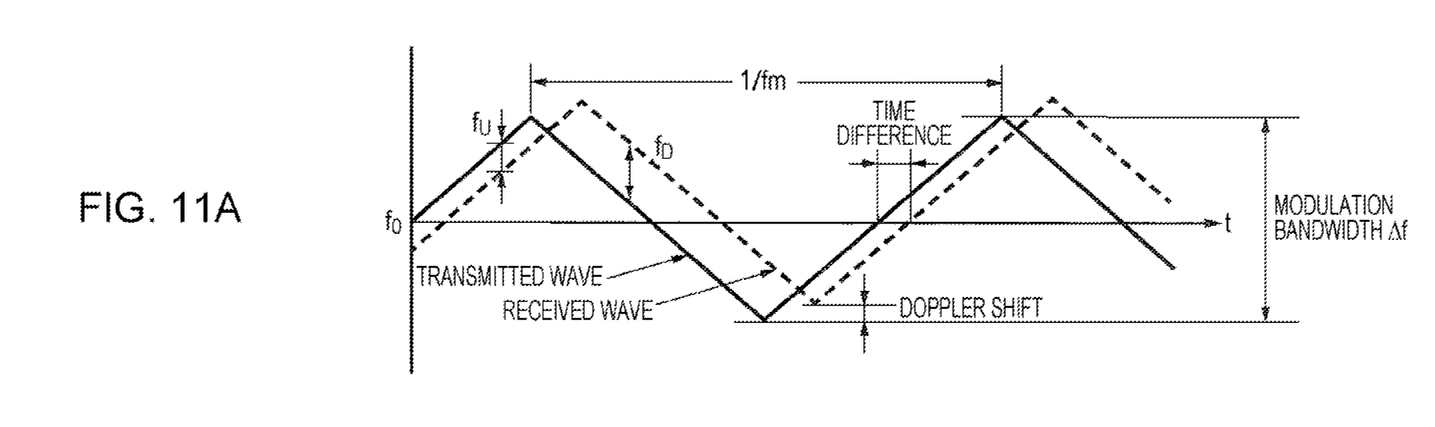
FIG. 11A is a diagram illustrating an example of signals with a triangular waveform that is used in a continuous-wave radar of FMCW system.

FIG. 11A is a diagram illustrating signals with a triangular waveform that are used in a continuous-wave radar of FMCW system.

The modulation signal generator 381 generates a signal for modulation that corresponds to the FMCW system. On condition that the transmission signals are modulated with use of triangular waves, for instance, specifically, the signal with the triangular waveform that is illustrated as an example in FIG. 11A is generated.

The oscillator 382 carries out frequency modulation processing for the continuous waves of the transmission signals with use of the signal for modulation generated by the modulation signal generator 381 and thereby generates the transmission signals.

The directional coupler 383 outputs the transmission signals generated by the oscillator 382 to the mixer processor 386 that will be described later and to the radio transmitter 384.

The radio transmitter 384 carries out the D/A conversion, the power amplification, the transmit beamforming, and/or the like for the transmission signals inputted from the directional coupler 383, as necessary, generates radar transmission signals, and outputs the radar transmission signals to the transmission antenna 10.

The radio receiver 385 amplifies reception signals received by any of the reception antennas 20#1 to 20#M, carries out the intermediate frequency conversion, the ND conversion, and/or the like for the signals, as necessary, and outputs the signals to the mixer processor 386.

The mixer processor 386 generates intermediate frequency (IF) signals, based on portions of the transmission signals acquired from the directional coupler 383 and the reception signals received from the radio receiver 385. The IF signals the mixer processor 386 generates are signals in which a difference in the frequency between each of the transmission signals and each of the reception signals is reflected.

The intermediate frequency amplifier 387 carries out power amplification processing for the IF signals generated by the mixer processor 386.

The frequency analysis processor 388 performs Fourier transform of the amplified IF signals and acquires the frequency characteristics of the reception signals. The frequency analysis processor 388 may perform the same processing as the frequency analysis processor 344 performs as described for the first embodiment.

Figure 11B:
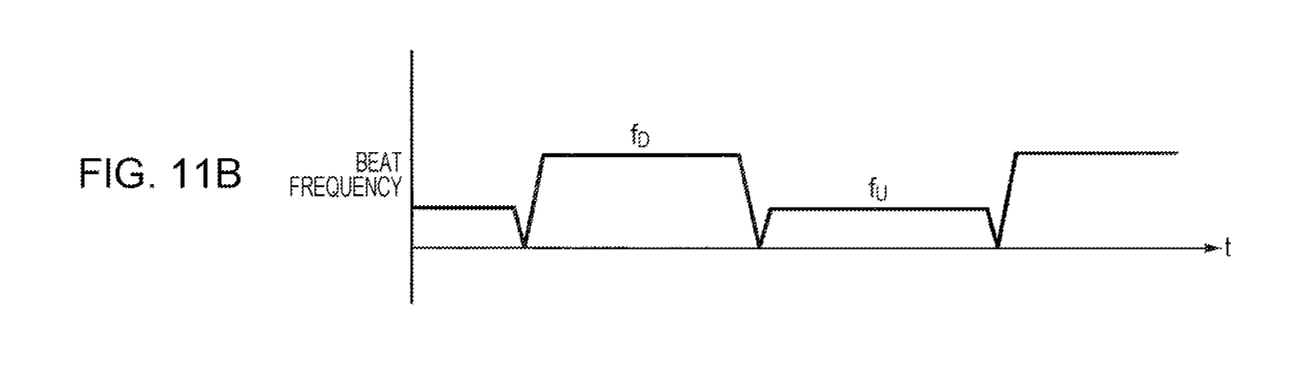
FIG. 11B is a diagram illustrating an example of beat frequencies that are used in the continuous-wave radar of FMCW system.

FIG. 11B is a diagram illustrating an example of beat frequencies that are used in the continuous-wave radar of FMCW system.

The beat frequency detector 39 calculates the beat frequencies based on the frequency characteristics generated by the frequency analysis processors 388 and based on the peak of the power spectra of the target object identified by the conformity calculator 35. In FIG. 11B, the beat frequency $f_D$ is the beat frequency during frequency increase and the beat frequency $f_U$ is the beat frequency during frequency decrease. The beat frequencies detected by the beat frequency detector 39 may be detected as frequencies corresponding to the peak position of the power spectra of the target object. Thus the radar apparatus 100b is capable of calculating the relative velocity between the radar apparatus 100b and the target object, the distance from the radar apparatus 100b to the target object, and the like based on the detected beat frequencies.

In the third embodiment, the relative velocity between the radar apparatus 100b and the target object, the distance from the radar apparatus 100b to the target object, and the like may be calculated without the extension in the detection time, by removal of the peaks of the power spectra of particulate obstacles and by extraction of the peak of the power spectra of the target object based on the beat frequencies acquired by the continuous-wave radar of FMCW system.

Though the various embodiments have been described above with reference to the drawings, it is needless to say that the present disclosure is not limited to such examples. It is apparent that those skilled in the art may conceive various alterations or modifications within the scope described in the claims and it is to be understood that such alterations and modifications shall fall under the technical scope of the present disclosure as a matter of course. Components of the embodiments may arbitrarily be combined unless departing from the purport of the disclosure.

For instance, the frequency analysis processors generate the power spectrum for each of the reception antennas 20#1 to 20#M numbering in M in the embodiments described above, whereas the present disclosure is not limited thereto. The reception signals from the plurality of reception antennas may be synthesized and the power spectrum may be generated based on a result of such synthesis, for instance. In such a method, the result of the synthesis of the reception signals from the plurality of reception antennas may be corrected based on the conformity indicator calculated by the conformity calculator for the reception antennas and the peak may be detected based on a result of such correction.

Functional blocks that are used for the description on the embodiments are typically implemented as LSIs that are integrated circuits having input terminals and output terminals. The LSIs may separately be made into single chips or some or all of the LSIs may be integrated on a single chip. Elements referred to as LSIs herein may be referred to as integrated circuits (ICs), system LSIs, super LSIs, or ultra LSIs in accordance with degree of integration.

Technology of forming the integrated circuits may be achieved by use of dedicated circuits or general-purpose processors without limitation to LSIs. Besides, field programmable gate arrays (FPGAs) that are programmable after manufacture of LSIs and/or reconfigurable processors in which connection or setting of circuit cells inside LSI is reconfigurable may be used.

Furthermore, in case where a new technology for forming integrated circuits that replace LSIs is developed as a result of progress in semiconductor technology or other technologies derived therefrom, the functional blocks may be integrated with use of the technology, as a matter of course. Such possibility may include application of biotechnology.

<Overview of the Present Disclosure>

The radar apparatus according to the present disclosure includes: a plurality of reception antennas, which in operation, each receive one or more reflected waves resulting from reflection of one or more radar transmission signals by one or more objects to output one or more reception signals; a plurality of frequency analysis processing circuitry, which in operation, performs frequency analysis of each of the plurality of reception signals received respectively by the plurality of reception antennas to acquire a frequency characteristic of each of the plurality of reception antennas; conformity calculation circuitry, which in operation, calculates a conformity indicator which indicates a degree of conformity in a peak of each of the frequency characteristics between each of the plurality of reception antennas based on the frequency characteristics of the plurality of reception antennas; a plurality of peak detection circuitry, which in operation, correct the frequency characteristics of the plurality of reception antennas with use of the conformity indicator and detect a peak satisfying a specified condition from the corrected frequency characteristics; and object detection circuitry, which in operation, detects a target object from among the one or more objects based on the detected peak.

In the radar apparatus according to the present disclosure, the conformity indicator may be the standard deviation or the variance of the frequency characteristics.

In the radar apparatus according to the present disclosure, the frequency characteristics may be the power spectra of the plurality of reception signals.

In the radar apparatus according to the present disclosure, the plurality of peak detection circuitry may correct determined frequency characteristics of objects to be excluded from among the one or more objects, with use of the conformity indicator measured in advance, and may detect the peak with use as the specified condition of a threshold determined based on the corrected frequency characteristics of the objects to be excluded.

In the radar apparatus according to the present disclosure, the frequency analysis processing circuitry may make frequency analysis of a result of addition of the plurality of reception signals to acquire a total frequency characteristic of the plurality of reception signals, and the peak detection circuitry may correct the total frequency characteristic of the plurality of reception signals with use of the conformity indicator to detect the peak satisfying the specified condition from the corrected frequency characteristic.

In the radar apparatus according to the present disclosure, the radar apparatus may be the radar apparatus of pulse compression system and the peak detectors calculate the Doppler frequency based on the detected peak.

In the radar apparatus according to the present disclosure, the radar apparatus may be a continuous-wave radar apparatus of frequency modulated continuous wave system, the radar apparatus may comprise a beat frequency detection circuitry, which in operation, may detect beat frequencies based on the frequency characteristics and the conformity indicator, and the object detection circuitry may detect the target object based on the beat frequencies.

The target object detection method by the radar apparatus according to the present disclosure includes: performing frequency analysis of each of the plurality of reception signals received respectively by a plurality of reception antennas to acquire a frequency characteristic of each of the plurality of reception antennas, the plurality of reception antennas having received reflected waves resulting from reflection of one or more radar transmission signals by one or more objects; calculating a conformity indicator that indicates a degree of conformity in a peak of each of the frequency characteristics between each of the plurality of reception antennas based on the frequency characteristics for the plurality of reception antennas; correcting the frequency characteristics of the plurality of reception antennas with use of the conformity indicator and detecting the peak satisfying a specified condition from the corrected frequency characteristics; and detecting a target object from among the one or more objects based on the detected peak.

The present disclosure is suitable as a radar apparatus that detects a target object.

What is claimed is:

1. A radar apparatus comprising:
a plurality of reception antennas, which in operation, receives one or more reflected waves resulting from reflection of one or more radar transmission signals by one or more objects to output a plurality of reception signals;

a plurality of frequency analysis processing circuitry, which in operation, performs frequency analysis of the plurality of reception signals to acquire a plurality of frequency characteristics of the plurality of reception antennas;

conformity calculation circuitry, which in operation, calculates a conformity indication value based on the plurality of frequency characteristics, the conformity indication value indicating how closely waveforms adjacent to a peak of each of the plurality of frequency characteristics match each other;

a plurality of peak detection circuitry, which in operation, corrects the plurality of frequency characteristics with use of the conformity indication value, and detect a peak value that exceeds a certain threshold from the corrected plurality of frequency characteristics; and object detection circuitry, which in operation, detects a target object from among the one or more objects based on the detected peak value.

2. The radar apparatus according to claim 1, wherein the conformity indication value is a standard deviation or a variance of the plurality of frequency characteristics.

3. The radar apparatus according to claim 1, wherein the plurality of frequency characteristics are power spectra of the plurality of reception signals.

4. The radar apparatus according to claim 1, wherein the plurality of peak detection circuitry, in operation, corrects determined frequency characteristics of objects to be excluded from among the one or more objects, with use of the conformity indication value measured in advance, and the certain threshold is determined based on the corrected determined frequency characteristics of the objects to be excluded.

5. The radar apparatus according to claim 1, wherein the plurality of frequency analysis processing circuitry, in operation, performs frequency analysis of a result of addition of the plurality of reception signals to acquire a total frequency characteristic of the plurality of reception signals, and the peak detection circuitry, in operation, correct the total frequency characteristic of the plurality of reception signals with use of the conformity indication value to detect the peak value that exceeds a certain threshold from the corrected plurality of frequency characteristics from the corrected plurality of frequency characteristics.

6. The radar apparatus according to claim 1, wherein the radar apparatus is a radar apparatus of a pulse compression system, and the plurality of peak detectors, in operation, calculates a Doppler frequency based on the detected peak.

7. The radar apparatus according to claim 1, wherein the radar apparatus is a continuous-wave radar apparatus of a frequency modulated continuous wave system, and the radar apparatus comprises a beat frequency detection circuitry, which in operation, detects beat frequencies based on the plurality of frequency characteristics and the conformity indication value, and the object detection circuitry, in operation, detects the target object based on the beat frequencies.

8. A target object detection method by a radar apparatus, the target object detection method comprising:

receiving, by a plurality of reception antennas, one or more reflected waves resulting from reflection of one or more radar transmission signals by one or more objects to output a plurality of reception signals;

performing, by a plurality of frequency analysis processing circuitry, frequency analysis of the plurality of reception signals to acquire a plurality of frequency characteristics of the plurality of reception antennas;

calculating, by conformity calculation circuitry, a conformity indication value based on the plurality of frequency characteristics, the conformity indication value indicating how closely waveforms adjacent to a peak of each of the plurality of frequency characteristics match each other;

correcting, by a plurality of peak detection circuitry, the plurality of frequency characteristics with use of the conformity indication value;

detecting, by the plurality of peak detection circuitry, a peak value that exceeds a certain threshold from the corrected plurality of frequency characteristics; and detecting, by object detection circuitry, a target object from among the one or more objects based on the detected peak value.

* * * * *